Sept. 10, 1957    W. L. NUTTER, JR., ET AL    2,805,499
ANIMAL MARKER
Filed May 5, 1954
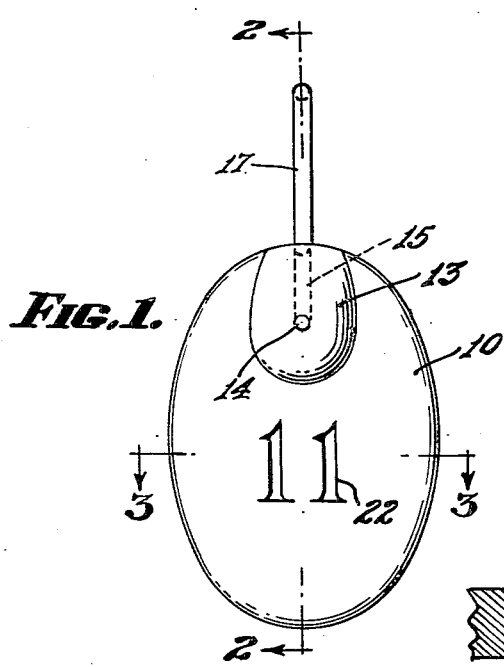
FIG. 1.
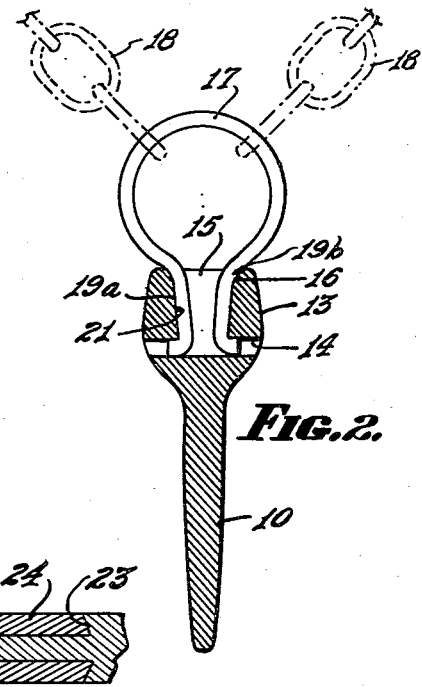
FIG. 2.
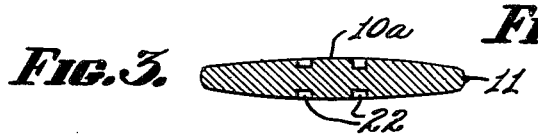
FIG. 3.
FIG. 7.
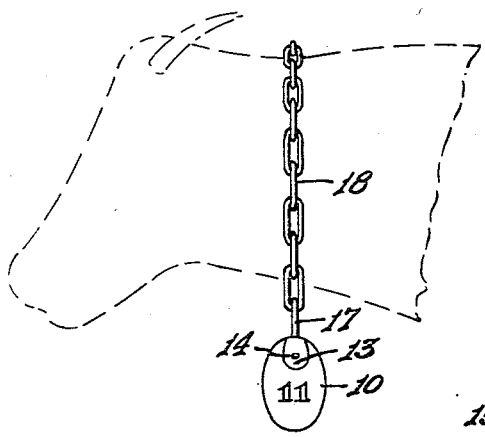
FIG. 6.
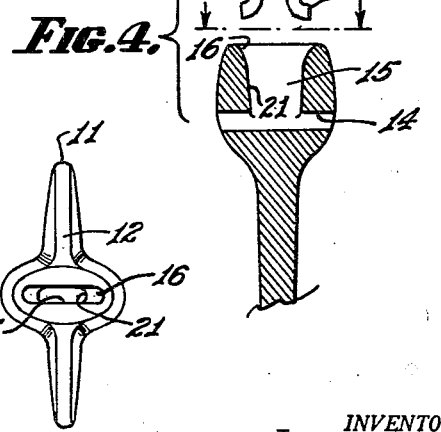
FIG. 4.
FIG. 5.
INVENTORS.
JAY D. WEIL
AND
BY WILLIAM LEE NUTTER, JR.,
Allen & Allen
ATTORNEYS.

United States Patent Office 2,805,499
Patented Sept. 10, 1957

2,805,499
ANIMAL MARKER

William Lee Nutter, Jr., Georgetown, and Jay D. Weil, Lexington, Ky.

Application May 5, 1954, Serial No. 427,828

3 Claims. (Cl. 40—3)

This invention resides in the provision of a new animal marker and in particular is directed to a novel cattle tag.

Many types of animal markers have been used in the past with varying degrees of success. One of the chief problems encountered in connection with tags and markers of this general type is that of wear. Animals are almost constantly in motion at least sufficient to cause a swinging or jiggling of the marker which is oftentimes placed about their neck and suspended from a suitable chain or the like. The chain or other support member is usually made of a metal material considerably harder than that of which the marker is constituted with the result that the constant jiggling causes the softer material of the marker to be considerably worn so that eventually such marker may easily be lost or pulled off when caught in a fence or brush or the like.

It is usually desirable that the animal marker be readily visible to those at either side of the animal, especially for show purposes. If the marker becomes unduly worn, however, then it may swing about to random positions which make it unsatisfactory.

Also, it is sometimes necessary to remove or change tags and in the past this has not always been easy to do.

The art has heretofore endeavored to solve some of these problems in various ways. One such prior art construction involves the use of a metal insert of a very hard piece of metal in the vicinity of the place of attachment of the marker to the chain or suspending means. This has met with some success but has proved expensive and not a full answer to the problem because there is still movement between the metal insert and the suspending means with the result that even in this type of marker there eventually is considerable wear.

As above indicated a primary problem in connection with animal markers is to produce a marker which the animal cannot rub off against a fence, tree or other such obstruction.

It is to the solution of the above indicated problems and others, that our invention is directed. Accordingly, it is an object of our invention to provide an animal marker which may be secured to a chain or other suspending means and which will last for long periods of time even when at all times suspended from the neck of the animal.

Another important object of this invention is to provide an animal marker which cannot easily be dislodged by the animal.

Another object of this invention is to provide an animal marker which may be manufactured economically and with a minimum of difficulty.

Yet another object of this invention is to provide a tag which while difficult for an animal to lose or get rid of is easy for a handler or the like to change or take off or put on as required.

These and other objects of our invention will become apparent to one skilled in the art during the course of the following description and with reference to the accompanying drawings, in which drawings like numerals are employed to designate like parts throughout the same and in which:

Figure 1 is a front elevation of the animal marker of this invention,

Figure 2 is a section taken on the line 2—2 of Figure 1,

Figure 3 is a section taken on the line 3—3 of Figure 1,

Figure 4 is an exploded view, partly in section, of the animal marker and the attaching means with which it is to be associated.

Figure 5 is a plane view taken along the line 5—5 of Figure 4,

Figure 6 is a perspective view showing the marker in place about the neck of an animal, and Figure 7 is a fragmentary section showing one way of applying colored indicia to the tag.

Referring now to the drawings as just described, it will be observed that we have provided an animal marker or cattle tag generally indicated at 10. The marker has a generally thickened central portion which extends to a narrower portion at the sides and ends, the marker defining a generally oval-shaped area when viewed in front elevation as shown in Figure 1. The thickened central portion of the tag 10 is generally indicated at 10a in Figure 3 and the narrower side portions at 11 in Figures 3 and 5. The narrower or thinner upper end is designated at 12 in Figure 5.

The marker comprising the blank or plate 10 is formed with an enlarged portion 13 which constitutes a very important part of this invention. It is believed preferable that the plate 10 and the portion 13 be formed integrally.

Towards the lower extremity of the enlarged portion 13 there is provided a bore 14 which extends at right angles to the general plane of the tag body. A centrally located opening 15 extends from the upper portion of the tag 10 and integral portion 13 to the bore 14. The width of the opening 15, considered in the plane of the tag 10, is equal to the diameter of the bore 14.

As perhaps best seen in Figures 4 and 5 it will be observed that the opening 15 is formed with an upper flare as indicated at 16. The importance of this formation will become more apparent during the description of the cooperation of the marker 10 with the means by which it is secured to a suitable chain or suspending device.

As indicated, the marker 10 is designed to be employed with means by which it may be suitably connected to a chain or other device fastened about the neck of the animal as shown in Figure 6. The connecting means is shown at 17 and the chain at 18.

The means 17 comprises a U-shaped member having legs 19 which comprise a dual male latch and which are turned outwardly as shown at 20. The width of the opening 15, considered in its major direction, this being at right angles to the plane of the tag itself, is less than the distance from one turned-out end 20 to the other. Thus, as the legs 19 are pushed downwardly within the opening 15 they will be moved together as the outward end 20 strikes the interior walls 21 defined by the opening 15. The member 17 being made of resilient material, these outwardly turned leg ends 20 will be able to latch or engage within the bore 14 when the member 17 has been pushed to its full extent within the opening 15. The diameter of the member out of which the means 17 is formed is substantially equal to that of the bore 14. This means that the legs 19 and outwardly turned ends 20 are just nicely received within the opening 15 and the bore 14. A very snug engagement is thus provided. In order that the snug engagement between the member 17 and the tag 10 be further insured, the interior wall 21 and flared portion 16, both defined by the opening 15, are configured to be flush with the exterior portions 19a and 19b of the member 17 when in place. This is best illustrated in Figure 2 which shows the member 17 as engaged within the portion 13 of the tag 10. By designing the enlarged portion 13 of the marker 10 so that, in effect, the U-shaped member 17 seats within the upper end thereof we provide an arrangement insuring a very tight engagement between the major parts as represented by the U-shaped retaining means 17 and tag member 10—13.

It will be understood that the links of the chain 18 will engage within the U-shaped member 17 as shown in Figure 6 and as indicated in dotted lines in Figure 2. In this connection it is pointed out that the chain can be adjusted in length to fit large or small animals simply by engaging the U-shaped member 17 in various of the links 18.

It will be observed that any swinging movement of the tag 10 will be the result of relative movement between the chain links 18 and the member 17 and not between the member 17 and the tag 10. In this way there is no wear between the parts 13 (10) and 17. The relative hardness of the material from which the chain links 18 and the member 17 are made is such as to withstand nicely the wearing, rubbing action as will occur upon movement of the animal on which the tag is suspended in the manner indicated.

It is the snug engagement between the member 17 and the marker 10—13, the engagement being such that these members move substantially as a single unit with respect to the chain links, that insures the success of our invention and the solution of the problems set forth above. Because there is substantially no relative movement between the member 17 and the tag 10—13 we are able to form these members of materials of different hardness without harmful effects. This is not true of the prior art arrangements known to us wherein in all cases there is relative movement between a hard material and a soft material which results in undue wear and a file-like action which limits the useful life of such markers.

It will be apparent that the faces of the markers 10 may bear any suitable indicia as generally indicated at 22 in the various figures. It will also be apparent that it is well-night impossible for cattle to dislodge the member 17 from the tag 10—13. In order to remove, for example, the member 17 from the tag body it is necessary to force the legs 19 towards one another so that the ends 20 may be disengaged from within the bore 14. This is a sort of action of which cattle and the like are incapable.

In Figure 7 we have illustrated a good way of applying indicia to the tag. Thus, rather than simply apply coloring matter to grooved areas as indicated at 22 in Figure 3, we form dovetailed grooves 23 corresponding to the desired indicia and there we cause to be inserted plastic strips 24. These colored plastic strips may be bent for insertion and released within the grooves whereupon they spring into snug engagement within these grooves 23. In this manner we form tags having permanent colored indicia thereon which will not wear off.

It is to be understood that although we have described our invention as being embodied in certain particular structures, we do not intend to be limited to such structures except in so far as they are specifically set forth in the sub-joined claims. It will also be understood that certain modifications may be made in our invention without departing from the scope and spirit thereof. Having thus described our invention, what we claim as new and what we desire to protect by way of United States Letters Patent is:

1. An animal marker comprising a main plate-like body having an enlarged portion at one end thereof, said enlarged portion having a bore extending therethrough near the bottom thereof and perpendicular to the plane of the main body, and said enlarged portion also having an orifice extending from the outer edge thereof to said bore, the walls defining said orifice slanting outwardly and upwardly from said bore, and the extremities of said walls being flared outwardly in the vertical plane passing through the center of said marker at right angles to the plane of said main body.

2. The marker of claim 1 in which the width of the orifice as measured in the direction of the plane of the main body is substantially equal to the diameter of said bore.

3. The combination of an animal marker and means to engage a suspending device, said marker comprising a plate having a thickened portion at one end, the engaging means being resilient and of substantially ring-shaped configuration and terminating in a pair of legs having short out-turned end extensions, said thickened portion having a bore extending therethrough near the bottom thereof and an orifice extending from the edge thereof to said bore, said orifice defining interior side walls of the same configuration as the outer edges of said legs, the distance between said side walls being less than that between said leg extensions, said bore just nicely receiving said leg end extensions, and said thickened portion also contacting said engaging means substantially at the juncture of the legs with the ring-shaped portion thereof, whereby a snug relationship, substantially free of relative movement, is obtained between the marker and the engaging means, said bore extending at right angles to the plane of said marker, and the width of the orifice as measured in the direction of the plane of said plate being substantially equal to the diameter of said bore.

References Cited in the file of this patent

UNITED STATES PATENTS

| Number | Name | Date |
|---|---|---|
| 716,377 | Cadwallader | Dec. 23, 1902 |
| 1,020,308 | Patterson | Mar. 12, 1912 |
| 1,791,551 | Behrman | Feb. 10, 1931 |
| 1,820,925 | Toncray | Sept. 1, 1931 |
| 2,331,636 | Stone | Oct. 12, 1943 |
| 2,383,419 | Schacht | Aug. 31, 1945 |
| 2,573,781 | Wishart | Nov. 6, 1951 |